United States Patent
Steinke et al.

(10) Patent No.: US 9,824,114 B1
(45) Date of Patent: Nov. 21, 2017

(54) MULTIPLE CONCURRENT CURSORS FOR FILE REPAIR

(71) Applicant: EMC Corporation, Hopkinton, MA (US)

(72) Inventors: Ronald Stuart Steinke, Tacoma, WA (US); Dharmesh Shah, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 424 days.

(21) Appl. No.: 14/673,310

(22) Filed: Mar. 30, 2015

(51) Int. Cl.
*G06F 17/30* (2006.01)

(52) U.S. Cl.
CPC .. *G06F 17/30362* (2013.01); *G06F 17/30171* (2013.01)

(58) Field of Classification Search
CPC ......... G06F 17/30362; G06F 17/30171; G06F 17/30067; G06F 17/30224; G06F 17/30091; G06F 17/30194; G06F 11/1076; G06F 2211/104; G06F 2211/1028; G06F 2211/1059; G06F 11/1402; G06F 11/2089; G06F 3/061; G06F 3/0617; G06F 3/0619; G06F 3/064; G06F 3/0644; G06F 3/0689; Y10S 707/99953; Y10S 707/99938; Y10S 707/99956; G11B 20/1803; H04N 21/2318
USPC ........... 707/999.202, 822, 999.008, 999.204; 711/114, 150, 162, 165; 710/200
See application file for complete search history.

(56) References Cited

U.S. PATENT DOCUMENTS

| | | | | |
|---|---|---|---|---|
| 5,379,417 A | * | 1/1995 | Lui | G06F 11/1076 706/916 |
| 5,987,477 A | * | 11/1999 | Schmuck | G06F 17/30224 |
| 6,032,216 A | * | 2/2000 | Schmuck | G06F 9/52 707/999.01 |
| 6,499,039 B1 | * | 12/2002 | Venkatesh | G06F 3/0607 |
| 7,877,545 B2 | * | 1/2011 | Sharma | G06F 3/0617 711/114 |
| 7,937,421 B2 | * | 5/2011 | Mikesell | G06F 11/1096 707/825 |
| 8,843,459 B1 | * | 9/2014 | Aston | G06F 17/30067 707/694 |
| 2007/0198889 A1 | * | 8/2007 | Moore | G06F 11/1076 714/758 |
| 2008/0040553 A1 | * | 2/2008 | Ash | G06F 11/1076 711/133 |

* cited by examiner

*Primary Examiner* — Dennis Truong
(74) *Attorney, Agent, or Firm* — Krishnendu Gupta (57) ABSTRACT

Implementations are provided herein for the use of multiple threads in concurrently restriping files by maintaining multiple cursors for a single file. The cursors can be stored and tracked on disk in a mirrored data structure ("MDS") extension block also referred to as a Cursor Extension Block. During a restripe operation, individual cursors stored in the delta-block portion of the MDS extension block will be updated using delta operations of a file system. The operating system kernel can maintain an in-memory version of the delta-block portion of the MDS extension block as well. The Cursor Extension Block associated with a file can store data representing the ending logical cluster number of the cursor, the current logical cluster number of the cursor, and a current cursor count for a file.

20 Claims, 6 Drawing Sheets

MULTIPLE CONCURRENT CURSORS FOR FILE REPAIR

FIELD OF THE INVENTION

This invention relates generally to processing data, and more particularly to systems and methods for multiple concurrent cursors for file repair within large scale storage systems.

BACKGROUND OF THE INVENTION

Distributed file systems offer many compelling advantages in establishing high performance computing environments. One example is the ability to easily expand, even at large scale. An example distributed file system is one that is distributed across multiple nodes in a cluster of nodes. An individual node can encompass a set of storage drives capable of storing data accessible by clients of the clusters of nodes. In some distributed file systems, files or objects can striped across different physical storage devices in a single node or across multiple nodes of a cluster. By striping blocks of a file or object across multiple drives and/or nodes, including mirroring the same blocks on multiple drives and/or nodes, individual drive or node failure can occur without preventing a client from accessing data, portions of which may have been stored on the failed drive and/or node.

A file system layout can allocate segments of a file or object to be striped across multiple storage drives and/or multiple nodes. For example, when a file is initially stored within a file system, the file system may optimally write the contents of the file by striping the file across multiple storage drives according to desirable goals of the file system, such as performance, backup, etc. While initially, a proscribed layout may be beneficial or tolerable by the file system, operating conditions of the file system may change making a restripe of the file desirable. For example, if segments of a file were stored in a drive that has since reached capacity, is unbalanced, or has since become unusable, it may be desirable to restripe the file so that its segments are no longer affected by these changed conditions. Thus, restriping refers to the act of updating the layout of a file structure. It can be applied to all allocated segments of a file, including clones of the same segment of a file.

The basis of a restripe operation is a cursor. A cursor represents is the basic of the iterative process to restripe a file. A protection group can signify to the file system how the file system should store and protect data. The cursor works through the file to change the protection group of a file, on a block by block basis. One method to restripe files is by using a single cursor per file. When using a single cursor approach, restripe work is also limited to a single thread per file. In addition, a single cursor approach may also lead to locking the entirety of a file during a restripe operation.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a data lock can be taken on a block range associated with a hinted cursor among a set of cursors, wherein the set of cursors are associated with a file, wherein the file is associated with a cursor block, and wherein the cursor block includes a current position and an end range for cursors in the set of cursors, a total number of cursors in the set of cursors, and a total number of unfinished cursors in the set of cursors. It can be determined if the hinted cursor among the set of cursors is valid. In response to determining the hinted cursor is valid, it can be determined if the hinted cursor is finished. In response to determining if the hinted cursor is not finished, the hinted cursor can be acquired and the acquired hinted cursor can be processed.

In accordance with another aspect, it can be determined if the set of cursors are finished based on comparing the total number of cursors and the total number of unfinished cursors. In response to determining the set of cursors are not finished, it can be determined if a subset of the set of cursors are not busy. In response to determining the subset of not busy cursors, a set of available cursors in the subset of cursors can be determined. In response to determining the set of available cursors, a largest cursor range among the set of available cursors can be determined. In response to determining the largest cursor range includes cursor zero, cursor zero can be selected as the hinted cursor. In response to determining the largest cursor range does not include cursor zero, an available cursor in the set of available cursors can be chosen based on a midpoint of the range.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "logical cluster number" ("LCN") denotes a set of disk blocks of a data region of a file. It can be appreciated that the use of cluster in this terminology does not relate to a cluster of nodes as used elsewhere in this specification.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

"Delta data" as used herein, refers to data elements, fields, or ranges, of a data structure where updates to such data may be recorded in a journaling system rather than being applied directly to actual instance of the data structure.

"Non-delta data" as used herein, refers to data elements, fields, or ranges, of a data structure where updates to such data may be applied directly to an instance of the data structure rather than recorded as journal deltas.

"Journal deltas" as used herein, refers to entries or records stored in a journaling system that may record or track changes made to the delta data of a data structure instance.

"Concurrently" as used herein, refers to multiple writers, readers or cursors accessing the same file at the same time. Multiple writers may be writing to the same file; multiple readers may be reading from the same file; multiple cursors may be restriping the same file, or a mix of writers, readers, and cursors may be writing, reading, and restriping from the same file at the same time.

U.S. patent application Ser. No. 13/461,637 Titled "Multiple Writers to a Single File", U.S. Pat. No. 7,752,402 titled "Systems and Methods for Allowing Incremental Journaling", U.S. Pat. No. 7,676,691 titled "Systems and Methods for Providing Nonlinear Journaling", U.S. Pat. No. 7,822,932 titled "Systems and Methods for Providing Nonlinear Journaling", U.S. Pat. No. 7,899,800 titled "Systems and Methods for Providing Nonlinear Journaling", U.S. Pat. No. 7,346,720 titled "Systems and Methods for Managing Concurrent Access Requests to a Shared Resource" are hereby incorporated by reference.

Implementations are provided herein for the use of multiple threads in concurrently restriping files by maintaining multiple cursors for a single file. The cursors can be stored and tracked on disk in a mirrored data structure ("MDS") extension block also referred to as a Cursor Extension Block. During a restripe operation, individual cursors stored in the delta-block portion of the MDS extension block will be updated using delta operations of a file system. The operating system kernel can maintain an in-memory version of the delta-block portion of the MDS extension block as well. The Cursor Extension Block associated with a file can store data representing the ending logical cluster number of the cursor, the current logical cluster number of the cursor, and a current cursor count for a file.

At the start of a restripe operation, the kernel can automatically create an optimal number of cursors for a file based on the file size and/or associated data structures, such as a b-tree block. Each cursor will span a region of the file indexed by the corresponding blocks of the file. For files that have fewer blocks than the maximum number of cursors, then the kernel can create one cursor for each block of the file. For files that have more blocks than the maximum number of cursors, the kernel can create the maximum number of cursors by interpolating the starting LCN's of each cursor among the blocks of the file.

Each node in a cluster of nodes that performs restripe work can cache a copy of the Cursor Extension Block. The cache can maintain flags for each cursor in the Cursor Extension block to identify a cursor as valid or busy. A valid cursor is a cursor that's position in memory matches its position on the disk. It can be appreciated that a valid cursor in memory must both match its value on the cursor disk block, and have a cached data lock to prevent the value on the disk block from being changed without having the in-memory cursor marked invalid. A busy flag can identify a cursor that is currently in use by a restripe thread. It can be further appreciated that in assessing whether a cursor is valid, the validity references the cursor in a particular node's in-memory cache, as there is only one on-disk copy that is shared cluster wide among all nodes, and it is always valid. The on-disk copy, however, can't always be read without waiting on locks held by other nodes among the cluster of nodes, which is to be avoided to minimize delays. The validity of a cursor is protected by a data lock, and is lost if another node acquires a data lock overlapping the current cursor position. In one example, a first node can process a cursor in one part of the file, a second node can process a cursor on a second part of the file, a third node can process client writes to data on a third part of the file, and a fourth node can read data on a fourth part of the file. To accomplish the previous example, each separate operation would acquire a lock to just the portion of the file to which the operation is operating on.

If while processing a cursor, a client requests access to read or write a portion of the file that overlaps with the cursor, the cursor can be released, and the copy of the cursor extension block cached in-memory can be invalidated to be restarted after the read or write lock is released. This situation can be deemed a lock loss. Furthermore, the cache also can maintain the timestamp of the last time each cursor lost validity, e.g., suffered a lock loss. It can be appreciated that by maintaining the timestamp of the last time each cursor lost validity, data lock collisions may be able to be avoided when choosing a cursor to restripe. A valid cursor that has a current position that matches the cursor's ending position can be interpreted as finished, and once validated, will not return to invalid during the life of the restripe operation. Once every cursor associated with the file is valid and finished, the file has been effectively restriped.

In one example locking process, at the start of a restripe operation, an exclusive LIN lock is taken for the whole file, and the MDS extension block is created for the file on disk. The MDS extension block can also be loaded in-memory to cache for use in processing cursors. Individual cursors can then be validated, where in order to be validated, a delta lock must be established for each individual cursor within the MDS extension block. If another process or node has a lock on the cursor block, the cursor will not be validated. If the exclusive LIN lock on the file is lost, or a lock on a cursor block in memory is lost, the process can still continue and valid cursors can be processed. If both the exclusive LIN lock and the lock on the cursor block is lost, then the cursor block can be cleared from cache memory and the process for the cursor block can be restarted when the locking can be reacquired.

Figure 2:
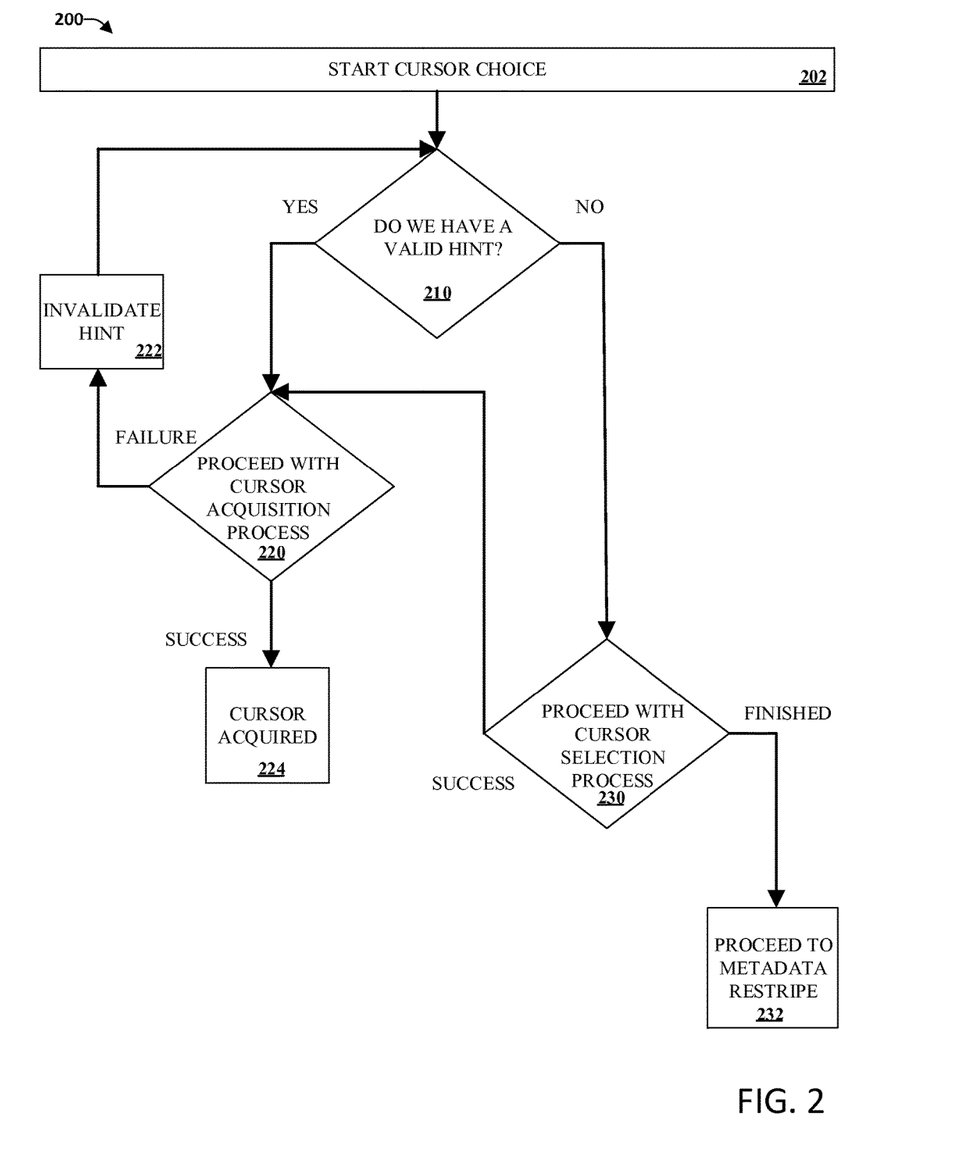
FIG. 2 illustrates an example method for cursor choice in accordance with implementations of this disclosure.
Figure 3:
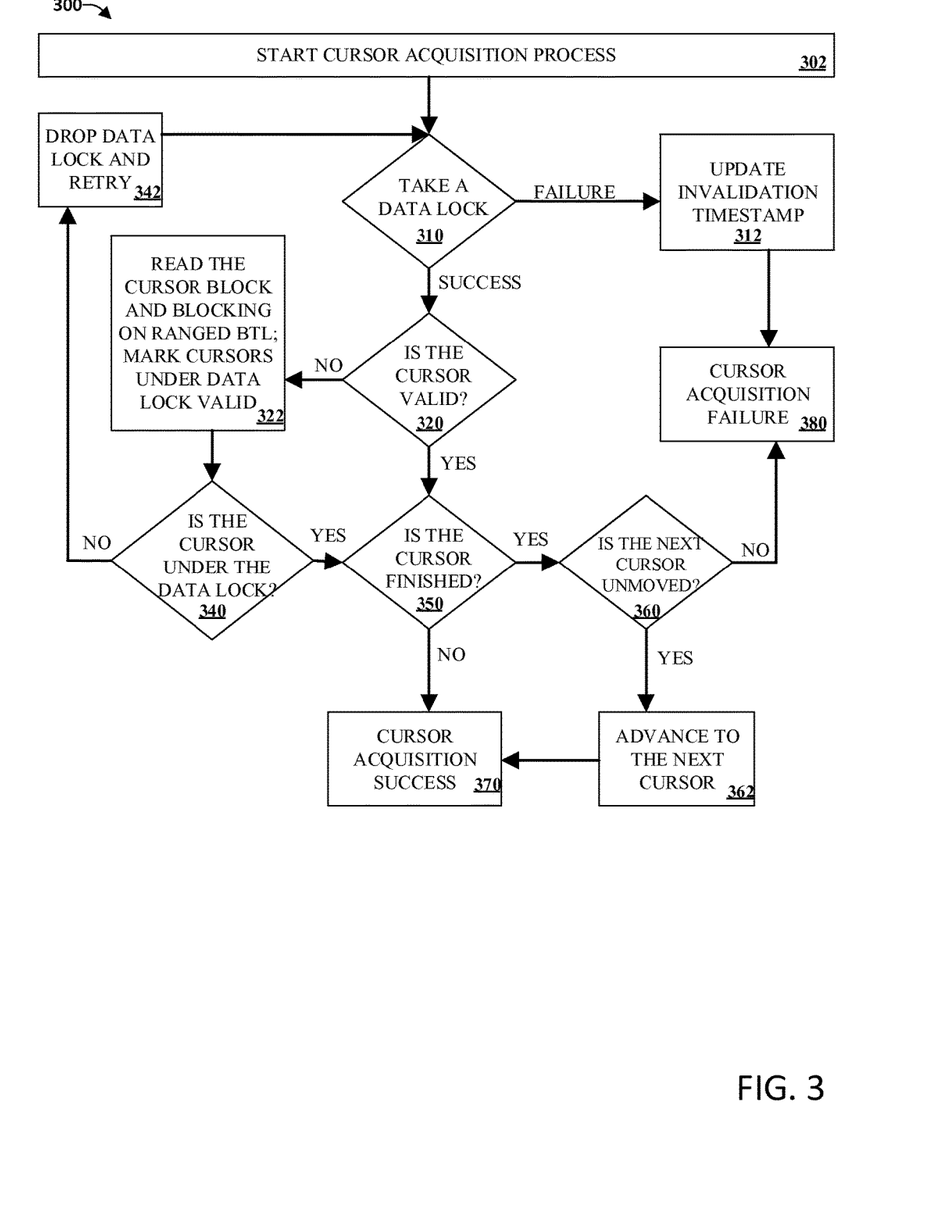
FIG. 3 illustrates an example method for cursor acquisition in accordance with implementations of this disclosure.
Figure 4:
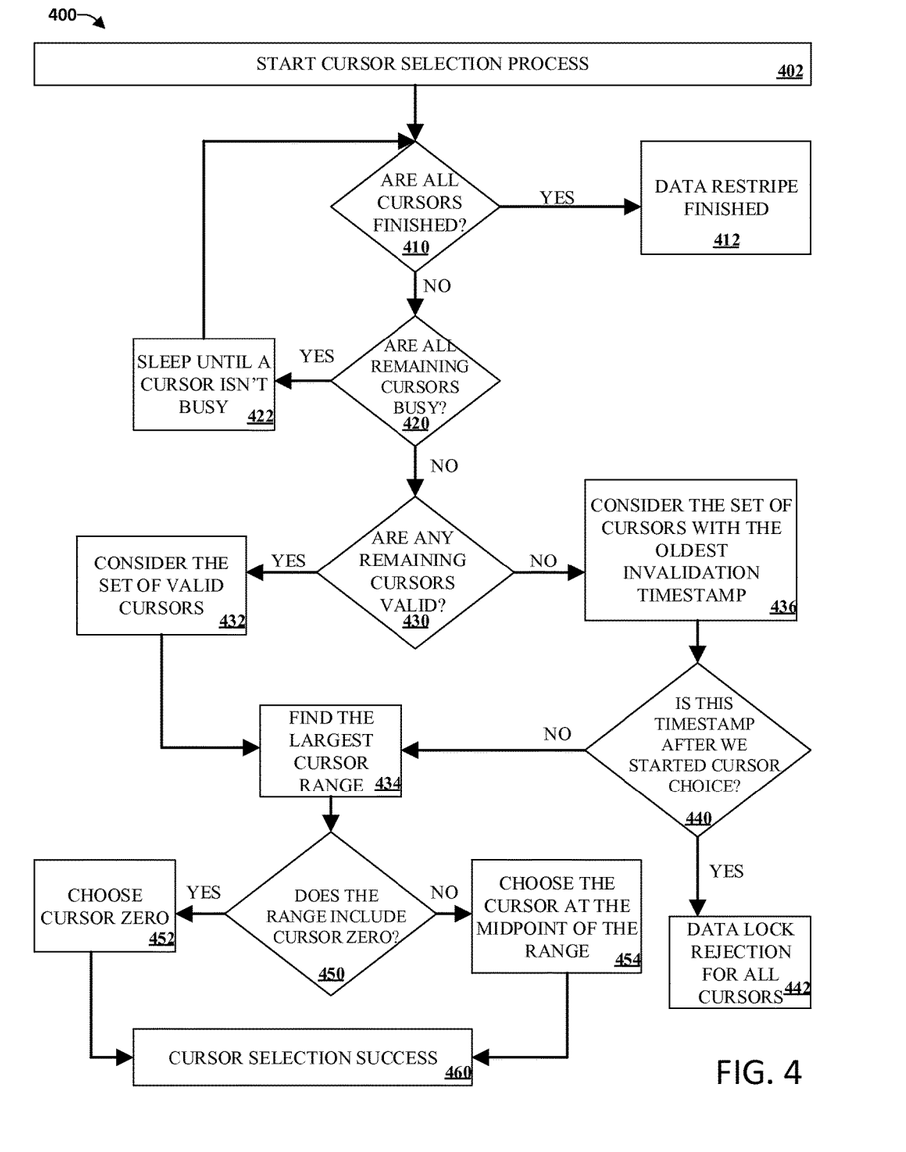
FIG. 4 illustrates an example method for cursor selection in accordance with implementations of this disclosure.

When a node begins to dedicate resources to restriping a file, it must first choose which cursor or set of cursors to process first. It can be appreciated that it is desirable to keep successive restripe operations contiguous to aid in prefetching any necessary data. It can also be appreciated that it is desirable to keep the work of separate restripe threads well separated so that they can each maintain their cursors in the cache, even if they are on separate nodes. It can also be appreciated that it is desirable to avoid contention with data locks associated with segments of the file, as, for example, acquiring a lock for those segments can be resource intensive. FIG. 2 as referred to and described in greater detail below illustrates a flow diagram method for cursor choice including utilizing a hint to begin acquiring a specific hinted cursor. FIG. 3 as referred to and described in greater detail below illustrates a flow diagram method for acquiring a specific cursor to begin processing. FIG. 4 as referred to and described in greater detail below illustrates a flow diagram method for selecting a cursor, without a hint, for acquisition.

Figure 1:
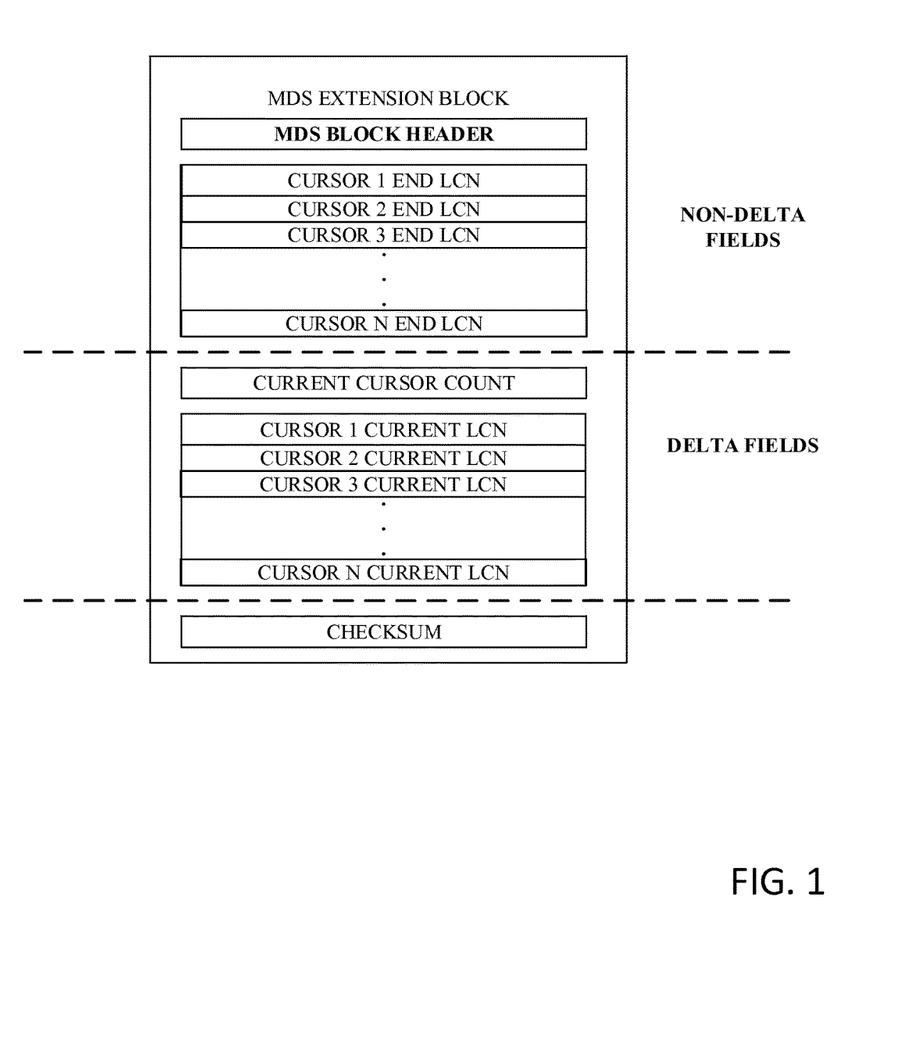
FIG. 1 illustrates an example mirrored data structure ("MDS") extension block in accordance with implementations of this disclosure.

Referring now to FIG. 1, there is illustrated an example MDS extension black in accordance with implementations of this disclosure. The MDS extension block can be stored on disk and a pointer to the in-memory cursor block can be stored in the in-memory copy of the LIN. Individual cursors stored in the delta fields can be updated using delta operation, thus avoiding necessitating a LIN lock to update the delta fields. It can be appreciated that only the portion of the file associated with the cursor need be locked to prior to the cursor processing the restripe. During a restripe operation, the kernel can also maintain an in-memory version of the delta block to facilitate delta operations. The MDS extension block is divided into two area, delta fields and non-delta fields. Non-delta fields including the MDS block header and the end LCN associated with the set of cursors. The end LCN associated with the set of cursors should remain static after the kernel creates a fixed number of cursors as a part of the restripe operation. As individual cursors operate to restripe the file, the delta fields can be updated to track cursor progress. The current cursor count delta field describes the current number of active (i.e., non-finished) cursors. The cursor current LCN fields track the progress of each individual cursor. Thus, immediately after the cursors creation, each cursor's current LCN starts at the beginning of the initial cursor range.

In one implementation, LCN's are 32-bit unsigned integers. Thus, each cursor will be 8-bytes in size (e.g., 32 bits for each LCN value associated with a cursor). In one implementation, including associated metadata such as the MDS block header, a total of 1020 cursors can stored within an 8 KiB MDS extension block. Thus, in the previous implementation, "N" would be 1020 and there would be 1020 entries for cursor end LCN's and 1020 entries for the cursor current LCN's. In one implementation, both the cursor end LCN and the cursor current LCN are absolute values and are not relative to the previous cursor. Thus, in one implementation, the maximum file size supported is 512 TiB. It can be appreciated that larger file sizes can be supported by adjusting the size of each cursor, for example, by using 5-byte unsigned integers, the maximum file size supported can be significantly higher. It can be appreciated that cursor offsets can be absolute to support large sparse regions without having multiple cursors pointing to a single btree leaf containing the sparse region.

As stated above, one implementation cursors positions are 32 bit values that can describe the cursor position in the file in 128K chunks.

FIGS. 2-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 2 illustrates an example method for cursor choice in accordance with implementations of this disclosure. Cursor choice involves choosing which cursor to attempt to acquire to begin performing a restripe operation on that cursor. For example, in one implementation, a file is divided into 1020 cursors, and it can be appreciated that choosing a cursor to process at random, or less intelligently, may not be the most efficient way to process cursors. As stated above, keeping successive restripe operations contiguous to aid in pre-fetch, keeping the work of separate restripe threads well separated to aid in the cursors maintaining their MDS extension block in cache, and avoiding contention with data locks are all desirable outcomes when choosing a cursor to process.

At 202, the cursor choice process can begin. At 210, it can be determined whether there is a hint or a cookie suggesting a cursor to acquire. For example, the hint may be generated previously based on the last known lock loss timestamp associated with cursors of the file, current cursor processing activity by other nodes by other threads of the same node, current active locks on cursor blocks, etc. If there is a hint associated with the cursor, the method can proceed to step 220 where an attempt to acquire the hinted cursor is made. The process for acquiring a cursor is detailed in FIG. 3 in greater detail. If the hinted cursor cannot be acquired, the hint is invalidated at 222, and the process can begin again at step 210. If the cursor is acquired, at step 224, the cursor can be processed and the restripe operation can proceed for that cursor.

At 210, if there is not a valid hint, a cursor selection process can begin at 230. The cursor selection process is detailed in FIG. 4 in greater detail. If the cursor selection process is successful, the selected cursor can be attempted to be acquired at 220. If there are no more cursors to select, the restripe operation on the data can be deemed complete, and the process can continue to restripe the metadata associated with the file based on the restriping activity of the data. It can be appreciated FIG. 3 illustrates an example method for cursor acquisition in accordance with implementations of this disclosure.

At 310, a data lock can be taken. For example, a data lock can be taken on the delta field of the cursor. In another example, the data lock can be taken on a block range associated with the file. If the data lock cannot be taken for the cursor, at 312, an invalidation timestamp associated with the cursor can be updated to indicate that as of the timestamp the cursor is locked and/or invalid. The cursor acquisition then fails at 380. As shown on FIG. 2, if the cursor acquisition fails, the cursor selection can determine a new cursor to acquire, and the method can begin anew with the new cursor to acquire at step 302. In one implementation, in response taking the data lock failing, an exclusive lock can be taken on the LIN prior to the method beginning anew.

In one implementation, a data lock can be taken on a block range associated with a hinted cursor among a set of cursors, wherein the set of cursors are associated with a file, wherein the file is associated with a cursor block, and wherein the cursor block includes a current position and an end range for cursors in the set of cursors, a total number of cursors in the set of cursors, and a total number of unfinished cursors in the set of cursors.

If the data lock is successfully taken, at 320, it can be determined whether the cursor is valid. In one implementation, a cursor is valid when the current position of the cursor in the cursor block in cache memory matches the position of the cursor in the cursor block stored on disk. For example, a cursor that is being processed by another node, or by another thread on the same node should be determined invalid. In another example, if the data lock taken at 310 is lost, the cursor can also lose its validity. It can be appreciated that a finished cursor, e.g., the current position of the cursor matches the end position of the cursor, once validated, should not return to invalid even if a lock is lost.

If the cursor is not valid, at 322, the cursor block can be read for ranged locks on the set of cursors. Any locked cursors discovered during the cursor block read can be marked as valid based on the data lock taken at 310. For example, if the data lock was taken for a range of cursors at 310, and it was determined that the data lock is still active for the range of cursors, the cursor lock can be changed to be valid for the block ranges where the data lock is still active. In one implementation, in response to determining the hinted cursor is not valid, it can be determined whether there are locked cursors in the set of cursors based on the data lock and the cursor block; and the locked cursors in the set of cursors can be marked as valid.

At 340, it can be determined whether the cursor to be acquired is under the data lock. If not, then we drop the data lock established at 310 at 342, and the process can restart at 310. If the cursor is under the data lock, the method can proceed to step 350.

At 350, it can be determined whether the cursor is finished. As stated above, a finished cursor can be determined if the current position of the cursor matches the end position of the cursor. If the cursor is not finished, at 370 the cursor can be acquired and processed. If the cursor is finished, at 360, it can be determined whether the next cursor in the cursor block is unmoved. For example, an unmoved cursor is valid and still residing under the data lock taken at 310. If the next cursor is unmoved, it can be acquired and process at 370. If the next cursor has moved, cursor acquisition fails at step 380.

FIG. 4 illustrates an example method for cursor selection in accordance with implementations of this disclosure. As shown in FIG. 2, when a hinted cursor can't be acquired, and there are no additional hinted cursors to attempt to acquire, that method called for selection of a cursor without a hint. The selection process begins at step 402.

At 404, it can be determined whether all the cursors in the set of cursors listed in the MDS extension block are finished. If all the cursors have finished, then at 412, it can be concluded that the data restripe on the file is complete. In one implementation, Determining if the set of cursors are finished is based on comparing the total number of cursors and the total number of unfished cursors. In one example, the MDS extension block tracks the current cursor count which can be used to determine whether there are unfinished cursors, as finished cursors are not a part of the current cursor count. In another example, when a cursors current LCN position matches the cursor's end LCN, the cursor can be deemed finished.

If all the cursors are not finished, at 420, it can be determined whether all remaining unfinished cursors in the set of cursors are busy. For example, a cursor may be busy if another node or another thread has already acquired and/or is processing the acquired cursor. As stated above, a node performing restripe work can maintain flags for each cursor in-memory (e.g., in cache) that state whether a cursor is busy and/or valid. If all the remaining unfinished cursors are busy, at 422, the process can sleep, or be delayed for a set period of time until restarting again at step 410.

At 430, it can be determined whether cursors in the set of available and unfinished cursors are valid. As stated above, a flag can be maintained to flag cursors as valid. In one implementation, a valid cursor is a cursor where the position of the cursor in-memory (e.g., its state in the cache memory of the node selecting a cursor) matches the cursor's position as stored on disk in the MDS extension block data structure. It can be appreciated that the node updates its copy of the MDS extension block in cache while selecting, acquiring and processing cursors. The validity of a cursor is protected by a data lock, and can be lost if another node acquires a data lock overlapping the valid cursor's position, as, for example, this indicates that another node has acquired a lock to modify the contents of that cursor and/or associated file data.

If at 430 if there are valid cursors remaining, the set of valid cursors can be considered at 432 and at 434, the largest cursor range among the set of valid cursors can be determined. For example, by selecting a cursor at the beginning of a large range, it may be possible to acquire and process sequential cursors to make the pre-fetch process (e.g., loading into buffer memory from stable storage file data to be restriped).

If at 430, there are no remaining valid cursors, at 436, we can look at the set of invalid cursors with the oldest invalidation timestamp. It can be appreciated that the invalid cursor with the oldest invalidation timestamp may have greater odds of becoming valid prior to invalid cursors with newer timestamps, as the older timestamp has had more time for other processes to release previously active data locks on the invalid cursors. At 440, if the oldest invalidation timestamp is after we started the cursor choice process in FIG. 2, then at 442 it is determined that a data lock is rejection the selection of any cursors, and the process can stop. It can be appreciated that if the oldest invalidation timestamp occurred after the cursor choice process started, that it is likely the cursor process is responsible for the data lock, and another thread and/or node may already be acquiring and/or processing any remaining unfinished, not busy, valid cursors. At 440, if the oldest invalidation timestamp is prior to starting the cursor choice process, then the method can proceed to step 434 and the largest cursor range associated with timestamps older than the cursor choice selection process can be determined.

At 450, it can be determined whether the cursor range discovered in step 434 includes the cursor zero (e.g., the first cursor in the MDS extension block list). If it does, then cursor zero can be selected at step 452 and the cursor selection process is complete at step 460 allowing the cursor acquisition process as described in FIG. 3 to begin using cursor zero as the hinted cursor. If it is determined at step 450 that the cursor range does not include cursor zero, a cursor can be selected at the midpoint of the range at step 454, and the cursor selection process is complete at step 460 allowing the cursor acquisition process as described in FIG. 3 to begin using midpoint cursor as selected at step 454 as the hinted cursor.

Figure 5:
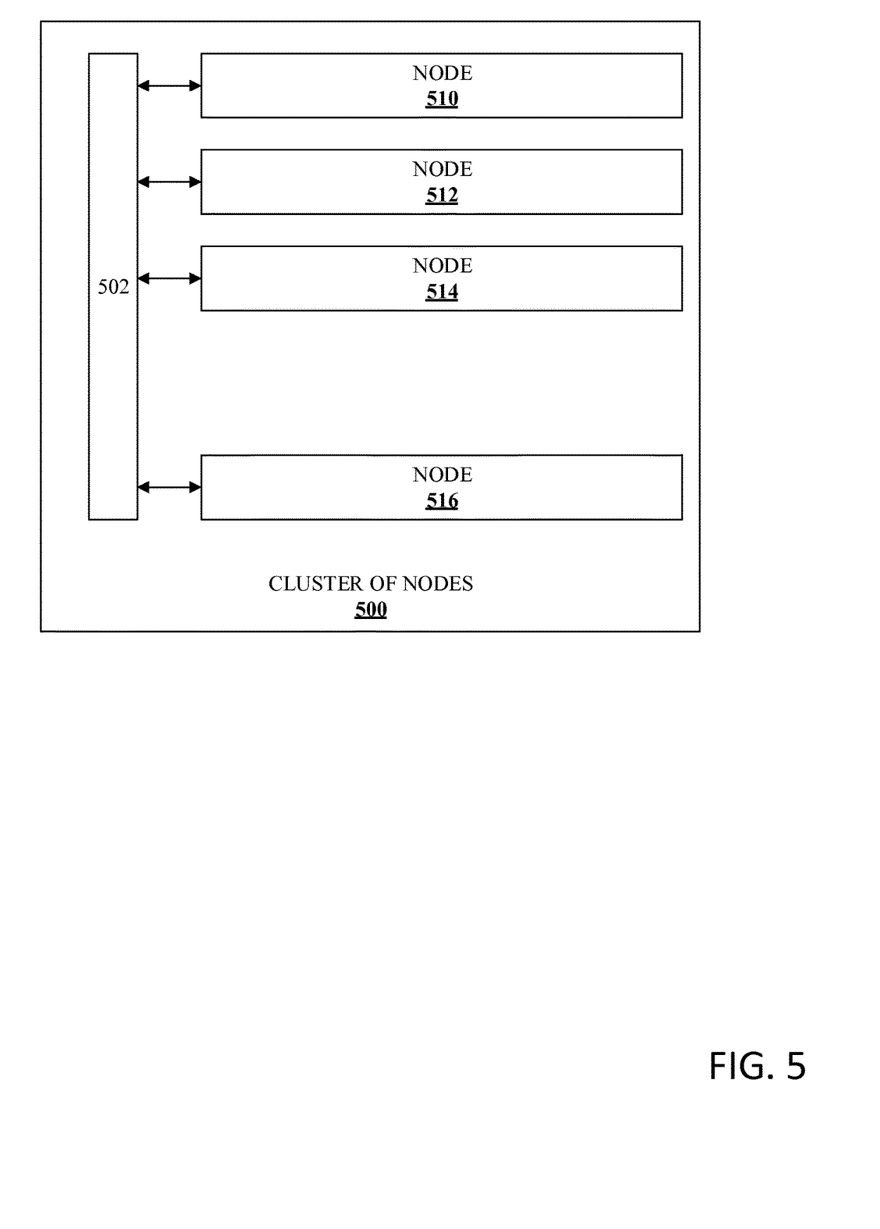
FIG. 5 illustrates an example block diagram of a cluster of nodes in accordance with implementations of this disclosure.

FIG. 5 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 510, 512, 514 and 516 operating in a cluster; however, it can be appreciated that more or less nodes can make up a cluster. It can be further appreciated that nodes among the cluster of nodes do not have to be in a same enclosure as shown for ease of explanation in FIG. 5, and can be geographically disparate. Backplane 502 can be any type of commercially available networking infrastructure that allows nodes among the cluster of nodes to communicate amongst each other in as close to real time as the networking infrastructure allows. It can be appreciated that the backplane 502 can also have a separate power supply, logic, I/O, etc. as necessary to support communication amongst nodes of the cluster of nodes.

It can be appreciated that the Cluster of Nodes 500 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 6:
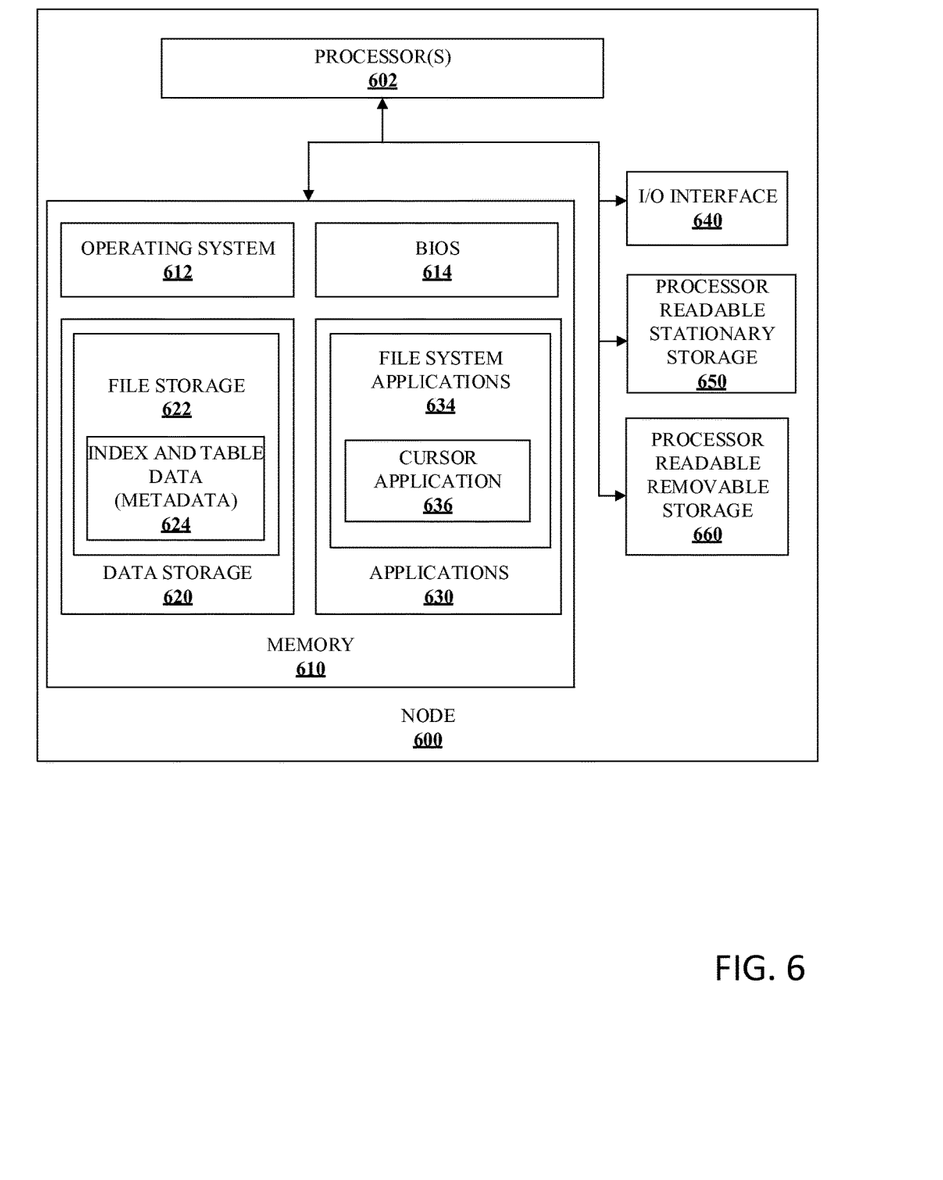
FIG. 6 illustrates an example block diagram of a node in accordance with implementations of this disclosure.

FIG. 6 illustrates an example block diagram of a node 600 in accordance with implementations of this disclosure.

Node 600 includes processor 602 which communicates with memory 610 via a bus. Node 600 also includes input/output interface 640, processor-readable stationary storage device(s) 650, and processor-readable removable storage device(s) 660. Input/output interface 640 can enable node 600 to communicate with other nodes, mobile devices, network devices, and the like. Processor-readable stationary storage device 650 may include one or more devices such as an electromagnetic storage device (hard disk), solid state hard disk (SSD), hybrid of both an SSD and a hard disk, and the like. In some configurations, a node may include many storage devices. Also, processor-readable removable storage device 660 enables processor 602 to read non-transitive storage media for storing and accessing processor-readable instructions, modules, data structures, and other forms of data. The non-transitive storage media may include Flash drives, tape media, floppy media, disc media, and the like.

Memory 610 may include Random Access Memory (RAM), Read-Only Memory (ROM), hybrid of RAM and ROM, and the like. As shown, memory 610 includes operating system 612 and basic input/output system (BIOS) 614 for enabling the operation of node 600. In various embodiments, a general-purpose operating system may be employed such as a version of UNIX, LINUX™, a specialized server operating system such as Microsoft's Windows Server™ and Apple Computer's IoS Server™, or the like.

Applications 630 may include processor executable instructions which, when executed by node 600, transmit, receive, and/or otherwise process messages, audio, video, and enable communication with other networked computing devices. Examples of application programs include database servers, file servers, calendars, transcoders, and so forth. Applications 630 may include, for example, file system applications 634, and cursor applications 636 according to implementations of this disclosure. It can be appreciated that cursor application 636 can store information in memory 610 such as in a cache or the like for use during restripe operations as discussed supra.

Human interface components (not pictured), may be remotely associated with node 600, which can enable remote input to and/or output from node 600. For example, information to a display or from a keyboard can be routed through the input/output interface 640 to appropriate peripheral human interface components that are remotely located. Examples of peripheral human interface components include, but are not limited to, an audio interface, a display, keypad, pointing device, touch interface, and the like.

Data storage 620 may reside within memory 610 as well, storing file storage 622 data such as metadata or LIN data. It can be appreciated that LIN data and/or metadata can relate to rile storage within processor readable stationary storage 650 and/or processor readable removable storage 660. For example, LIN data may be cached in memory 610 for faster or more efficient frequent access versus being stored within processor readable stationary storage 650. In addition, Data storage 620 can also host index and table data 624 such as cursor data in accordance with implementations of this disclosure. Index and table data can be stored as files in file storage 622.

In at least one of the various embodiments, a file may be referenced by an inode that may contain file meta-data, including references, and/or pointers to the file's data blocks. In at least one of the various embodiments, if writers want to write to a file they may need to obtain a lock on the inode to prevent other writers from changing the contents of the inode while a writer is in the middle of a write transaction. In at least one of the various embodiments, the file may be distributed among one or more data storage servers in a distributed data cluster.

In at least one of the various embodiments, a lock manager may be arranged to coordinate the locking protocol between writers or readers and file resources, including the inodes and file data. A lock manager may be part of an operating system 612 or file system. In at least one of the various embodiments, a lock manager manages lock contention among distributed writers or readers within and among distributed nodes of a data cluster. In at least one of the various embodiments, writers or readers of files access the information in an inode by using file system calls, operating system calls, API's, or the like. In at least one of the various embodiments, locking rules may be enforced by a lock manager. A lock manager may enforce the lock rules across a file system that may be implemented on one or more computing devices. A file system may be distributed among multiple data storage nodes and compute nodes.

Also, individual files may be distributed across one or more nodes that may be arranged in a cluster. However, in at least one of the various embodiments, there may be a single logical inode for each file that may be required to maintain file system consistency. In at least one of the various embodiments, a locking manager may control access to inodes based on a locking protocol that may include delta read locks and delta write locks. For example, in at least one of the various embodiments, multiple writers or readers across multiple data storage nodes may be concurrently contending for access to files that likewise may be stored across multiple data storage nodes. A locking manager may be arranged to enforce the locking protocol and guarantee that the inode of the distributed file data remains consistent. Locking managers may also be responsible for ensuring that delta writes that may have been recorded as journal deltas may be reconciled and resolved if required, such as if a preparing to grant a process a shared or exclusive lock.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method for concurrently restriping files comprising:
taking a data lock on a block range associated with a hinted cursor among a set of cursors, wherein the set of cursors are associated with a file, wherein the file is associated with a cursor block, and wherein the cursor block includes a current position and an end range for cursors in the set of cursors, a total number of cursors in the set of cursors, a total number of unfinished cursors in the set of cursors, and wherein the hinted cursor is based on being more likely than other cursors in the set of cursors to be at least one of valid or in an efficient cursor block location;
determining if the hinted cursor among the set of cursors is valid;
in response to determining the hinted cursor is valid, determining if the hinted cursor is finished; and
in response to determining the hinted cursor is not finished:
acquiring the hinted cursor; and
restriping the file corresponding to the acquired hinted cursor.

2. The method of claim 1, further comprising;
in response to determining the hinted cursor in not valid, determining locked cursors in the set of cursors based on the data lock and the cursor block; and
marking the locked cursors in the set of cursors as valid.

3. The method of claim 1, further comprising:
in response taking the data lock failing, taking an exclusive lock on the block range.

4. The method of claim 1, further comprising:
in response to determining the hinted cursor is finished, determining if a next cursor in the set of cursors is unmoved; and
in response to determining the next cursor is unmoved, acquiring the next cursor.

5. The method of claim 1, further comprising:
determining if the set of cursors are finished based on comparing the total number of cursors and the total number of unfished cursors;
in response to determining the set of cursors are not finished, determining a subset of the set of cursors that are not busy;
in response to determining the subset, determining a set of available cursors in the subset of the set of cursors based on validity flags;
in response to determining the set of available cursors, determining a largest cursor range among the set of available cursors;
in response to determining the largest cursor range includes cursor zero, selecting cursor zero as the hinted cursors; and
in response to determining the largest cursor range does not include cursor zero, selecting an available cursor in the set of available as the hinted cursor based on a midpoint of the range.

6. The method of claim 5, wherein the largest cursor range includes multiple sequential cursors.

7. The method of claim 5, further comprising:
in response to determining the set of available cursors to be empty, determining an oldest subset of cursors in the subset based on the oldest subset of cursors sharing an oldest invalidation timestamp;

determining if the oldest invalidation timestamp is older than a timestamp associated with the determining if the set of cursors are finished; and in response to determining the oldest invalidation timestamp is older than the timestamp associated with the determining if the set of cursors are finished, adding the oldest subset of cursors to the set of available cursors.

8. The method of claim 7, further comprising:

in response determining the oldest invalidation timestamp is newer than the timestamp associated with the determining if the set of cursors are finished, taking an exclusive lock on the block range.

9. The method of claim 1, wherein the current position is a 32 bit value associated with a 128 kilobyte chunk of the file.

10. The method of claim 1, wherein cursors in the set of cursors are associated with a flag wherein the flag is either valid or busy.

11. A non-transitory computer readable medium with program instructions stored thereon to concurrently restripe files by performing the following acts:

taking a data lock on a block range associated with a hinted cursor among a set of cursors, wherein the set of cursors are associated with a file, wherein the file is associated with a cursor block, and wherein the cursor block includes a current position and an end range for cursors in the set of cursors, a total number of cursors in the set of cursors, a total number of unfinished cursors in the set of cursors, and wherein the hinted cursor is based on being more likely than other cursors in the set of cursors to be at least one of valid or in an efficient cursor block location;

determining if the hinted cursor among the set of cursors is valid;

in response to determining the hinted cursor is valid, determining if the hinted cursor is finished; and in response to determining the hinted cursor is not finished:

acquiring the hinted cursor; and restriping the file corresponding to the acquired hinted cursor.

12. The non-transitory computer readable medium of claim 11 with program instructions stored thereon to further perform the following acts:

in response to determining the hinted cursor is not valid, determining locked cursors in the set of cursors based on the data lock and the cursor block; and marking the locked cursors in the set of cursors as valid.

13. The non-transitory computer readable medium of claim 11 with program instructions stored thereon to further perform the following acts:

in response taking the data lock failing, taking an exclusive lock on the block range.

14. The non-transitory computer readable medium of claim 11 with program instructions stored thereon to further perform the following acts:

in response to determining the hinted cursor is finished, determining if a next cursor in the set of cursors is unmoved; and in response to determining the next cursor is unmoved, acquiring the next cursor.

15. The non-transitory computer readable medium of claim 11 with program instructions stored thereon to further perform the following acts:

determining if the set of cursors are finished based on comparing the total number of cursors and the total number of unfished cursors;

in response to determining the set of cursors are not finished, determining a subset of the set of cursors that are not busy;

in response to determining the subset, determining a set of available cursors in the subset of the set of cursors based on validity flags;

in response to determining the set of available cursors, determining a largest cursor range among the set of available cursors;

in response to determining the largest cursor range includes cursor zero, selecting cursor zero as the hinted cursors; and in response to determining the largest cursor range does not include cursor zero, selecting an available cursor in the set of available as the hinted cursor based on a midpoint of the range.

16. The non-transitory computer readable medium of claim 15, wherein the largest cursor range includes multiple sequential cursors.

17. The non-transitory computer readable medium of claim 15 with program instructions stored thereon to further perform the following acts:

in response to determining the set of available cursors to be empty, determining an oldest subset of cursors in the subset based on the oldest subset of cursors sharing an oldest invalidation timestamp;

determining if the oldest invalidation timestamp is older than a timestamp associated with the determining if the set of cursors are finished; and in response to determining the oldest invalidation timestamp is older than the timestamp associated with the determining if the set of cursors are finished, adding the oldest subset of cursors to the set of available cursors.

18. The non-transitory computer readable medium of claim 17 with program instructions stored thereon to further perform the following acts:

in response determining the oldest invalidation timestamp is newer than the timestamp associated with the determining if the set of cursors are finished, taking an exclusive lock on the block range.

19. The non-transitory computer readable medium of claim 11, wherein the current position is a 32 bit value associated with a 128 kilobyte chunk of the file.

20. The non-transitory computer readable medium of claim 11, wherein cursors in the set of cursors are associated with a flag wherein the flag is either valid or busy.

* * * * *